US006941812B2

(12) United States Patent
Sekimori et al.

(10) Patent No.: US 6,941,812 B2
(45) Date of Patent: Sep. 13, 2005

(54) CONVERTER AND METHOD OF MANUFACTURING THE SAME

(75) Inventors: Yukimitsu Sekimori, Tokyo (JP); Daiji Uehara, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 65 days.

(21) Appl. No.: 10/644,222

(22) Filed: Aug. 19, 2003

(65) Prior Publication Data

US 2004/0035214 A1 Feb. 26, 2004

(30) Foreign Application Priority Data

Aug. 20, 2002 (JP) .................................... 2002-239047

(51) Int. Cl.[7] ................................................ G01L 7/00
(52) U.S. Cl. ......................... 73/700; 257/202; 438/48
(58) Field of Search ..................... 73/700, 718, 719, 73/724, 862.046; 257/202, 204; 438/48, 50, 52

(56) References Cited

U.S. PATENT DOCUMENTS 5,900,549 A * 5/1999 Moriya ..................... 73/504.12

2002/0121145 A1 * 9/2002 DeConde et al. ........ 73/862.046

FOREIGN PATENT DOCUMENTS

| JP | 60-138434 | | 7/1985 |
| JP | 04-133458 | | 12/1992 |
| JP | 07-167725 | | 7/1995 |
| JP | 08-094472 | | 4/1996 |
| JP | 10270714 | * | 3/1997 |
| JP | 11-287724 | | 10/1999 |

\* cited by examiner

Primary Examiner—William Oen
Assistant Examiner—Andre Allen
(74) Attorney, Agent, or Firm—The Webb Law Firm

(57) ABSTRACT

A pressure sensor 10 included an upper substrate 30 having a detection face 30A, a diaphragm 20 provided with a space from the detection substrate 30 and displaceable to and from the upper substrate 30, fixed electrodes 32, 33 provided on the detection face 30A of the upper substrate 30, and a first signal fetching section 22 electrically connected to the diaphragm 20, and the diaphragm 20 is formed by dry-etching single-crystal silicon with the specific resistance lowered to 1.0 Ω·cm or below by mixing dopant lowering the resistance value.

20 Claims, 10 Drawing Sheets

CONVERTER AND METHOD OF MANUFACTURING THE SAME

BACKGROUND OF THE INVENTION

1. Field of the Invention

The present invention relates to a converter for converting a state quantity of, for instance, a pressure of a liquid or a gas, an acceleration, or a temperature to other type of state quantity such as an electrical signal.

2. Description of the Related Art

As a converter for converting one type of state quantity to other type of state quantity, there has been known, for instance, a pressure sensor for converting a pressure to an electrical signal.

FIG. 10 and FIG. 11 are a general perspective view and an exploded perspective view each showing a pressure sensor 110 based on the conventional technology.

The pressure sensor 110 comprises an upper substrate 130 and a lower substrate 140, each made from an insulating material such as glass; a variable electrode 120 which can be displaced against the upper and lower substrates 130, 140 and is made from silicon; and a fixed electrode 131 provided on a detection face 130A of the upper substrate 130 opposing to this movable electrode 120.

As shown by the two-dot chain line in FIG. 11, the fixed electrode 131 comprises a central electrode 132 provided at a substantially central portion of the detection face 130A of the upper substrate 130, and a peripheral electrode 133 surrounding the central electrode 132.

The movable electrode 120 is electrically connected to a first signal fetching section 122 extending from a side face 121C to an upper face 130B of the upper substrate 130.

As the movable electrode 120 is made from silicon, the first signal fetching section 122 is made from aluminum which can form an electrically ohmic conjunction with and also be wire-bonded to silicon.

The central electrode 132 and the peripheral electrode 133 are made from titanium having the corrosion resistance, and are electrically connected to second signal fetching sections 134, 135 made from aluminum on the upper face 130B (a surface opposite to the detection surface 130A) of the upper substrate 130 via through-holes 136, 137.

With the configuration as described above, when a pressure to be measured is loaded to the surface of the movable electrode 120 opposite to the lower substrate 140, the movable electrode 120 bends, and an electrostatic capacitance between the movable electrode 120 and the central electrode 132 or between the movable electrode 120 and the peripheral electrode 133 changes. By electrically connecting the electrodes 120, 132, 133 to a signal processing circuit via the signal fetching sections 122, 134, 135, it becomes possible to accurately measure the pressure to be measured by measuring changes in the electrostatic capacitances between the central electrode 132 and the movable electrode 120 and between the peripheral electrode 133 and the movable electrode 120.

When the converter 110 is used under the existence of corrosive gas, the corrosive gas is present also around each of the signal fetching sections 122, 134, 135, and the aluminum forming the signal fetching sections 122, 134, 135 may disadvantageously be afflicted by the corrosive gas.

To solve the problem, there may be the possibility of forming the signal fetching sections 122, 134, 135 with a metal having the high corrosive resistance against the corrosive gas such as, for instance, titanium. Although an excellent ohmic conjunction with silicon having a low content of impurities can not be obtained by using titanium, it is possible to obtain a good ohmic conjunction with silicon containing a large quantity of impurities. On the other hand, when the content of impurities of the silicon becomes higher, the specific resistance becomes lower, and also the adaptability to wet-etching with an alkali solution becomes disadvantageously lower.

For instance, there has been known the converter in which only a portion of the movable electrode contacting the first signal fetching section contains impurities (Refer to Japanese Patent Laid-Open Publication No. HEI 08-94472).

With the configuration, it is possible to obtain a good ohmic conjunction with the first signal fetching section in a portion of the movable electrode contacting the first signal fetching section, and also it is possible to prevent the adaptability to etching from being degraded in portions thereof other than that contacting the first signal fetching section.

However, in the converter in which a portion of the movable electrode contains impurities, as the impurities are locally introduced by means of the impurities dispersing method or the like in the process of manufacturing a silicon wafer forming the movable electrode, the number of production steps increases, which results in increase of production cost of the converter.

SUMMARY OF THE INVENTION

A main object of the present invention is to provide a converter which can be used even under the existence of corrosive gas and also which can be manufactured with low cost, and a method manufacturing the converter.

The present applicant made serious efforts to clarify the relation between types of metals having high corrosion resistance and specific resistances of silicon enabling to obtain good ohmic conjunctions with the highly corrosion-resistance metals, and further to clarify the relation between a specific resistance of silicon and the adaptability to etching. As a result the applicant found that the silicon's excellent adaptability to etching and its capability of forming an ohmic conjunction with a highly corrosion-resistant metal are compatible by controlling a specific resistance of the silicon within a specific range, and made this invention based on this finding.

To achieve the object described above, the following configuration is employed in the converter and the method of manufacturing the converter according to the present invention.

The converter according to the present invention comprises a first substrate having a detection face, a movable electrode which is provided with a space from the detection face of this first substrate and displaceable to and from the first substrate, a fixed electrode provided on the detection surface of the first substrate, and a first signal fetching section electrically connected to the movable electrode, and is characterized in that the first signal fetching section is made from metal having high corrosion resistance, and also that the movable electrode is made by dry-etching a single-crystal silicon containing dopant reducing the resistance value and as a result with the specific resistance of $1.0\ \Omega\cdot\text{cm}$ or below.

The first substrate is an insulating body, and is made from, for instance, glass, but may be made from other materials such as ceramics and new ceramics. The first signal fetching section may be made from a metal such as titanium, tungsten, molybdenum, chromium, tantalum, niobium, and vanadium, or an alloy containing one or more of the metals as main ingredients. The materials for the first substrate and for the first signal fetching sections are applicable to each of the components described hereinafter.

There is no specific limitation over the dry-etching method, and other methods using a reactive ion gas or a plasma gas may be employed.

In the present invention, the first signal fetching section is made from a highly corrosion-resistant metal against corrosive gas, so that the converter according to the present invention can be used, different from the conventional type of converters in which aluminum having low corrosion resistance is used, even under the existence of corrosive gas without the functions being degraded.

Further, as the movable electrode is made from single-crystal silicon containing dopant reducing the specific resistance, a problem relating to the energy barrier does not occur on the surface contacting the first signal fetching section, so that a good ohmic conjunction with a metal having high corrosion resistance which forms the first signal fetching section can be obtained, and a signal can be fetched from the movable electrode accurately without fail.

As the specific resistance of silicon forming the movable electrode is suppressed to 1.0 Ω·cm or below, in the manufacturing processing of a wafer used for a movable electrode, dopant (impurities) for reducing the specific resistance of the wafer may be dispersed in the entire wafer, a number of manufacturing steps can be reduced as compared to the conventional technology in which impurities are locally mixed in a wafer, which in turn enables production cost reduction in manufacturing converters.

When the specific resistance of silicon forming a movable electrode is over 1.0 Ω·cm, a good ohmic conjunction with a material forming the first signal fetching section can not be obtained. Further as the movable electrode is formed by dry-etching, the adaptability to being etched is not affected even when the specific resistance of the silicon is reduced, so that the dopant for reducing the specific resistance of silicon may be mixed therein to the saturation value.

The converter according to the present invention comprises a first substance having a detection face, a movable electrode which is provided with a space from the detection face of the first substrate and can be displaced to and from the first substrate, a fixed electrode provided on the detection face of the first substrate, and a first signal fetching section electrically connected to the movable electrode, and the first signal fetching section is formed with metal having high corrosion resistance, while the movable electrode is formed by wet-etching single-crystal silicon with the specific resistance reduced to the range from 0.005 to 1.0 Ω·cm by mixing therein dopant for reducing the resistance value.

There is not specific restriction over the method of wet-etching, and such materials as potassium hydroxide or TMAH may be used in the method.

In this method, the same effect as that in the above-described method of forming a movable electrode by dry-etching can be obtained. It is to be noted that, when the specific resistance of silicon forming the movable electrode is less than 0.005 Ω·cm, the etching rate becomes too low with a longer period of time required for machining to form the movable electrode and also with the surface roughness becoming high.

In the converter according to the present invention, the silicon used for forming the movable electrode preferably has the p-conduction type.

With the present invention, as compared to a case where n-conduction type of silicon is used, the contact resistance can be held at a low value, so that the better ohmic conjunction can be obtained.

In the converter according to the present invention, metal used for forming the first signal fetching section is preferably titanium.

With the present invention, as the first signal fetching section is formed with titanium, the first signal fetching section can be protected against corrosive gas without fail and with low cost.

The converter according to the present invention has preferably the configuration in which said converter comprises a second substrate provided on a surface contrary to that facing the detection face of the first substrate of the movable electrode with a space therefrom; an extending section extending longer as compared to the side face of the first substrate is provided; and the first signal fetching section is provided spanning from a surface in the first substrate side of the extending section to the surface in the contrary side from the detection face of the first substrate.

The converter has a second signal fetching section provided on a top surface of the first substrate and electrically connected to the fixed electrode, and after the converter is mounted on a circuit board with the second substrate facing downward, the first and second signal fetching sections and a signal processing circuit on the circuit board are electrically connected by means of, for instance, wire bonding.

With the present invention, as the extending section is provided on the second substrate and the first signal fetching section is provided spanning from a surface of the extending section closer to the first substrate to a surface of the first substrate, so that the first signal fetching section does not extend up to an edge (meaning an edge of the surface away from the movable electrode herein and hereinafter) of the second substrate. Therefore, even when the converter is mounted on a circuit board or the like with the edge side of the second substrate facing downward, the circuit board does not contact the first signal fetching section, so that electric troubles such as introduction of noises can be prevented.

In the converter according to the present invention, a wire bonding pad is provided on the first signal fetching section, and the wire bonding pad has at least two layers. The lower layer is preferably formed with metal having the excellent adhesion to conjunction with an oxide film on a surface of the metal used for forming the first signal fetching section, while the upper layer is preferably formed with highly corrosion-resistive metal having the excellent adhesion to conjunction with the lower layer and also having excellent bondability.

Herein the upper layer of the wire bonding pad is formed, for instance, with gold, but an alloy containing gold as the main ingredient may be used for the purpose. The lower layer section of the wire bonding pad is formed with, for instance, titanium, but any of such materials as chromium, nickel, cobalt, or tantalum may be used for the purpose, and further an alloy of the like containing any of titanium, chromium, nickel, iron, tungsten, silicon, aluminum, cobalt palladium, tantalum, and gold as the main ingredient may be used for the purpose.

During the converter manufacturing process, sometimes an oxide film may be generated in the surface layer before the wire bonding pad is formed, because the upper layer section of the first signal fetching section contacts oxidizing gas such as air.

With the present invention, the lower layer section of the wire bonding pad is formed with metal providing the excellent adhesion to conjunction with an oxide film of a surface of the metal forming the first signal fetching section and also the upper layer section of the wire bonding pad is formed with highly corrosion-resistive metal having the excellent adhesion to conjunction with the lower layer section and also having excellent bondability, and therefore the wire bonding pad can be bonded to the first signal fetching section even when an oxide film is formed on a surface of the first signal fetching section. Further, as the upper layer section having the excellent adhesion to bonding can electrically be connected to necessary portions such as a signal processing circuit or the like via a wire, a signal from the first signal fetching section can accurately be delivered to the signal processing circuit via the wire bonding pad without fail.

For instance, when the upper layer section of the first signal fetching section is formed with titanium, an oxide film may be formed on the surface before formation of the wire bonding pad because the titanium contacts air or the like. As there is not metal well adhering to the titanium oxide and yet having the excellent adhesion to conjunction to the titanium oxide, by using titanium well adapted to conjunction with the titanium oxide for the lower layer section and also using gold not well adapted to conjunction with the titanium oxide but well adapted to conjunction with titanium, it is possible to form a wire bonding pad having the required characteristics.

The converter, according to the present invention, is preferably an electrostatic capacitance type pressure sensor chip, in which a pressure to be measured is introduced to a surface of the movable electrode on the contrary side from the surface opposite to the detection face of the first substrate.

With the present invention, a pressure to be measured is applied to a surface of the movable electrode in the contrary side from the surface opposite to the detection face of the first substrate, the movable electrode bends due to the introduced pressure to be measured, the range between the movable electrode and the fixed electrode facing to the movable electrode changes, and the electrostatic capacitance varies in the inverse proportion to the change of the range. Therefore the converter according to the present invention can be used as an electrostatic capacitance type of pressure sensor by measuring the electrostatic capacitance between the movable electrode and the fixed electrode.

In the converter according to the present invention, it is preferable to form the first signal fetching section by means of mask evaporation after the anodic bonding between the first and second substrates and the movable electrode is established.

With the present invention, after the anodic bonding between the first and second substrates and the movable electrode is established, the first signal fetching section is formed by mask evaporation, so that the first signal fetching section can be formed without employing a complicated step such as photolithography, and a converter can easily be manufactured.

When the first signal fetching section is formed by means of mask evaporation before the anodic bonding is established, as the electric potential in the first signal fetching section is at the same level as that in the movable electrode, the electric potential in the anodic bonding may be disturbed, which may in turn makes it impossible to obtain the excellent conjunction strength.

In the converter according to the present invention, it is preferable to continuously form an upper layer section of the wire bonding pad, after the anodic bonding between the first and second substrates and the movable electrode is established and then a lower layer section of the wire bonding pad is formed by mask evaporation, without oxidizing a surface of the lower layer section of the wire bonding pad.

With the present invention, when a wire bonding pad is formed, after the lower layer section is formed by mask evaporation, the upper layer section is continuously formed by mask evaporation without having a surface of the lower layer section oxidized, namely without generating an oxide film on a surface of the lower layer section, so that the lower layer section and the upper layer section of the wire bonding pad can be adhered to each other without fail.

Therefore, as a wire bonding pad can be formed without employing such as a complicated step of photolithography, a converter can easily be manufactured.

In this step, if a wire bonding pad is formed by mask evaporation before the anodic bonding is established, sometimes a plurality of metals forming the wire bonding pad such as, for instance, gold and titanium may be melted due to the heat of the anodic bonding, and therefore it is necessary to form a wire bonding pad by mask evaporation after the anodic bonding is established.

After a lower layer section of the wire bonding pod is formed, if the surface is oxidized due to its exposure to air or the like, an oxide film is generated on the surface, and sometimes the lower layer section does not adhere to the upper layer section of the wire bonding pad, so that it is necessary to form the upper layer section in succession to formation of the lower layer section to prevent a surface of the lower layer section from being oxidized.

When the lower layer section of the wire bonding pad is formed with, for instance, titanium and the upper lower section with, for instance, gold, sometimes an oxide film may be generated on the surface due to the exposure of titanium to air or the like, which may in turn make adhesion of gold to the surface impossible.

DETAILED DESCRIPTION OF THE PREFERRED EMBODIMENT

One embodiment of the present invention is described below with reference to the related drawings.

Figure 1:
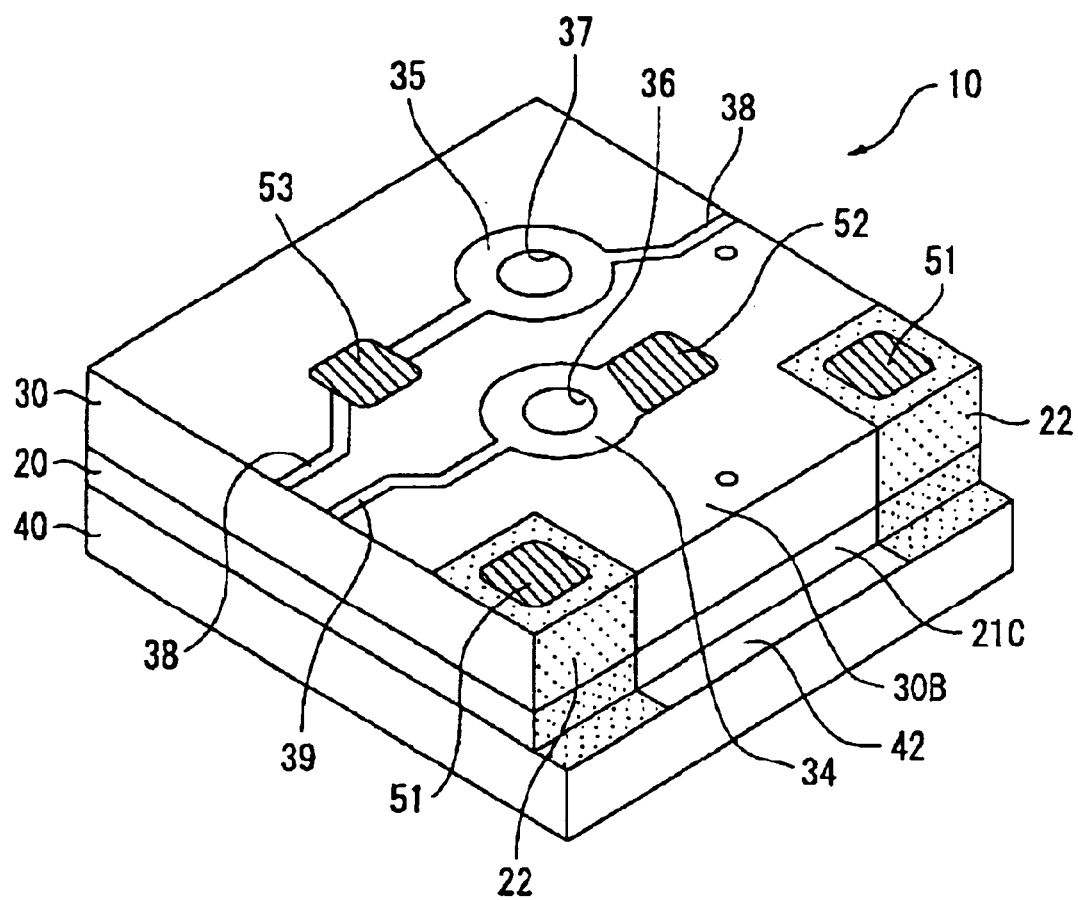
FIG. 1 is a general perspective view showing a converter according to an embodiment of the present invention.
Figure 2:
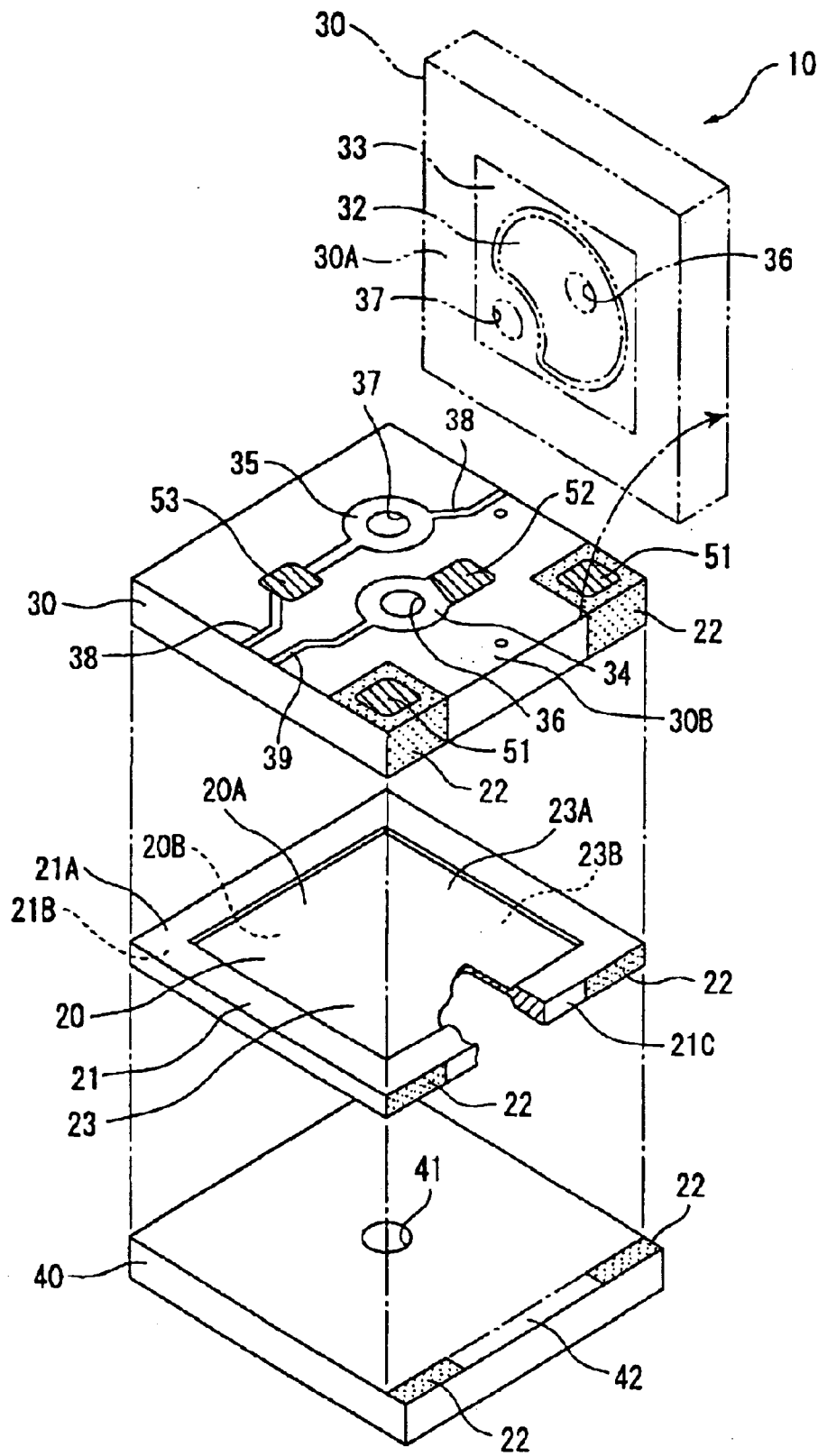
FIG. 2 is an exploded perspective view showing the converter according to the embodiment.

FIG. 1 is a general perspective view showing a pressure sensor 10 as a converter according to the present invention and FIG. 2 is an exploded perspective view showing the pressure sensor 10.

This pressure sensor 10 is an electrostatic capacitance type pressure sensor for detecting a change in a pressure as that in the electrostatic capacitance, and comprises a diaphragm 20 which is elastically formed as a movable electrode, an upper substrate 30 as a first substrate and a lower substrate 40 as a second substrate, which are in the anodic bonding to and holds the diaphragm 20.

The diaphragm 20 comprises a thin portion 23 and a thick portion 21 formed around the thin portion 23. Namely the diaphragm 20 has an opposing face 20A (second face) facing against the upper substrate 30, and a face in the contrary side from the opposing face 20A, namely an opposing face 20B (first face) facing against the lower substrate 40, and of the opposing face 20A, an upper surface 23A of the thin portion 23 is concaved as compared to an upper surface 21A of the thick portion 21, while, in the opposing face 20B, a lower surface 23B of the thin portion 23 is concaved and lowered than (higher in FIG. 2) the lower face 21B of the thick portion 21. Therefore, a space is formed between the thin portion 23 and the upper substrate 30 as well as the lower substrate 40, and the thin portion 23 is elastically deformable against the upper substrate 30.

The diaphragm 20 has a p-conduction type and is formed with single-crystal silicon, the specific capacitance of which is controlled to 1.0 Ω·cm or below by mixing dopant capable of lowering the specific resistance.

The upper substrate 30 is formed with an insulating material such as glass used in this embodiment, and comprises a detection face 30A on a surface facing against the diaphragm 20 and an upper face 30B in the contrary side from the detection face 30A as indicated by the two-dot chain line in FIG. 2.

The upper substrate 30 comprises fixed electrodes 32, 33 provided on the detection face 30A, second signal fetching sections 34, 35 electrically connected via through-holes 36, 37 to fixed electrodes 32, 33 provided on the upper face 30B, and a first signal fetching section 22 provided on the upper face 30B and electrically connected to the diaphragm 20.

The fixed electrodes 32, 33 are formed with titanium having high corrosion resistance, and comprises a central electrode 32 provided at a substantially central portion of the detection face 30A and a peripheral electrode 33 surrounding the central electrode 32.

The second signal fetching sections 34, 35 are formed with titanium like the electrodes 32, 33. The second signal fetching section 34 electrically connected to the central electrode 32 comprises an extended portion 39 extended up to an edge section of the upper substrate 30, while the second signal fetching section 35 electrically connected to the peripheral electrode 33 has an extended portion 38 extended up to two edge sections of the upper substrate 30 opposing to each other.

A space between the thin portion 23 of the diaphragm 20 and the upper substrate 30 is opened via the through-holes 36, 37 to the atmosphere.

The lower substrate 40 is formed with an insulating material such as glass used in the present embodiment, and a pressure introducing hole 41 for introducing a pressure onto the opposing face 20B of the diaphragm 20 is provided at a substantially central portion thereof. Further a side face of the lower substrate 40 is extended more outward as compared to the side faces of the diaphragm 20 and the upper substrate 30 to form an extended section 42.

The first signal fetching section 22 is provided from a surface of the extended section 42 on the side to the upper substrate 30 to two corner sections of the upper face 30B of the upper substrate 30 on the side to the extended section 42. With this configuration, the first signal fetching section 22 is electrically connected to a side face 21C of the thick section 21 of the diaphragm 20 on the side to the extended section 42.

In the first signal fetching section 22, the wire bonding pads 51 are provided on two corner sections of the upper face 30B of the upper substrate 30 on the side to the extended section 42, and wire bonding pads 52, 53 are provided in the second signal fetching sections 34, 35 respectively. The signal fetching sections 22, 34, 35 are electrically connected, via the wire bonding pads 51, 52, 53, to prespecified portions of the signal processing circuit (not shown) or other related sections.

Figure 3A:
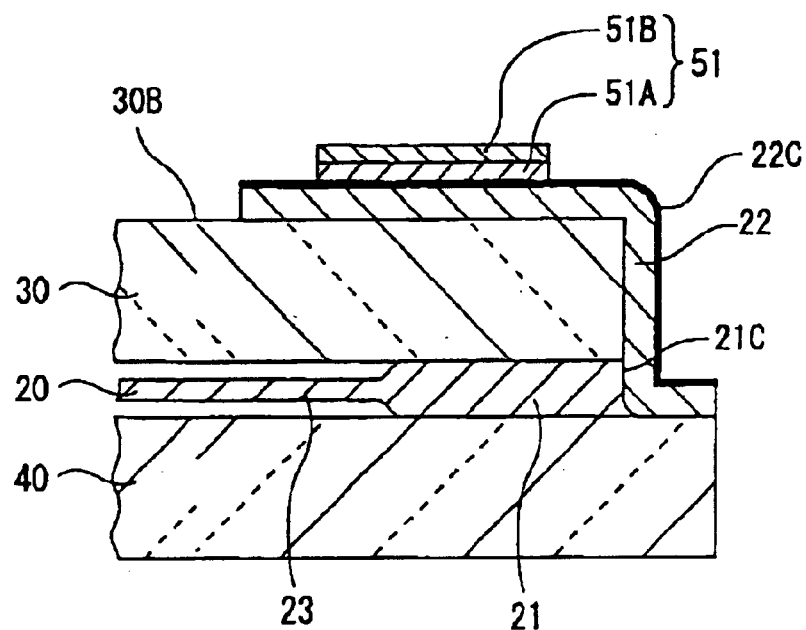
FIG. 3A and FIG. 3B are enlarged cross-sectional view showing first and second signal fetching sections and a wire bonding pad according to the embodiment above respectively.

FIG. 3A is an enlarged cross-sectional view showing the first signal fetching section 22 and the wire bonding pad 51.

The first signal fetching section 22 is formed with metal well adapted to adhesion to the upper substrate 30 and also having high corrosion resistance such as titanium used in this embodiment, and the surface is oxidized by the atmospheric air so that an oxide film 22C is formed thereon.

Each of the wire bonding pads 51 has two layers 51A, 51B, the lower layer section 51A is formed with metal well adapted to conjunction to the oxide film 22C on a surface of titanium forming the first signal fetching section 22 such as titanium used in this embodiment, and the upper layer section 51B is formed with metal well adapted to conjunction with the lower layer section 51B as well as to bonding and also having high corrosion resistance such as gold used in this embodiment.

Figure 3B:
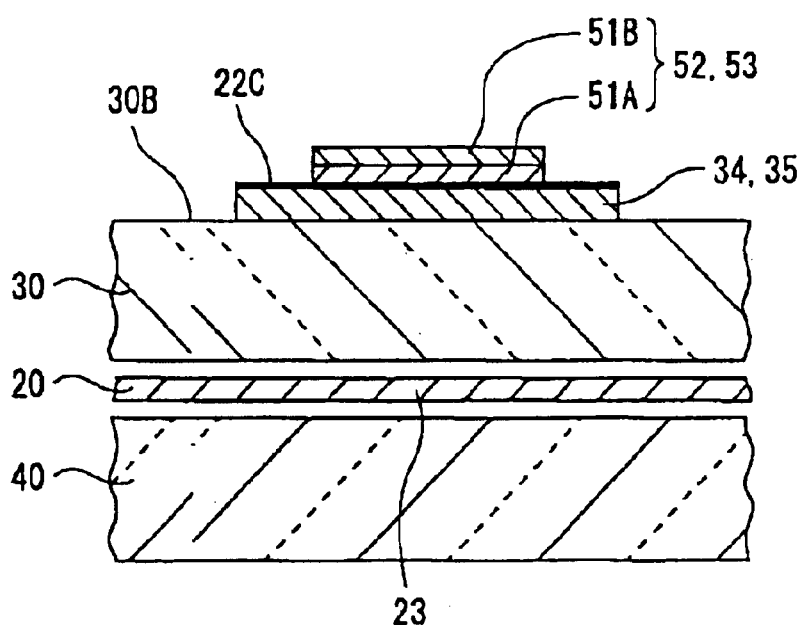

FIG. 3B is an enlarged cross-sectional view showing the second signal fetching sections 34, 35 and the wire bonding pads 52, 53.

The surface of titanium forming the second signal fetching sections 34, 35 is oxidized by atmospheric air and an oxide film 22C is formed thereon like in the first signal fetching section 22.

The wire bonding pads 52, 53 each have two layers 51A, 51B like the wire bonding pad 51, and the lower layer 51A is formed with titanium, while the upper layer 51B is formed with gold.

In the pressure sensor 10 as described above, when a pressure to be measured is introduced into the pressure introducing hole 41, the diaphragm 20 elastically deforms to bend, the distances between the diaphragm 20 and the central electrode 32 of the upper substrate 30 and between the diaphragm 20 and the peripheral electrode 33 change, so that the electrostatic capacitances change in inverse proportion thereto. As the diaphragm 20, central electrode 32, and peripheral electrode 33 are electrically connected via the first and second signal fetching sections 22, 34, 35 and the wire bonding pads 51, 52, 53 to the signal processing circuit or other related sections, a pressure can be measured by processing the electrostatic capacitances of the diaphragm 20 and the electrodes 32, 33 with the signal processing circuit.

In this step, displacement is relatively larger at or near the central portion, and smaller in the peripheral section, so that a difference is caused between the electrostatic capacitance generated between the diaphragm 20 and the central electrode 32 and the electrostatic capacitance generated between the diaphragm 20 and the peripheral electrode 33, and therefore the pressure can be measured accurately by measuring the aforementioned difference, with the deviation caused by the fluctuation in temperature or the like being corrected and the noises being removed. As a side of the diaphragm 20 facing the upper substrate 30 is opened to the atmosphere through the through-holes 36, 37, so that the pressure sensor 10 can functions as a sensor for measuring the so-called gauge pressure (a differential pressure against the atmospheric pressure assuming that the atmospheric pressure is zero).

A procedure for manufacturing the pressure sensor 10 is described below.

Figure 4A:
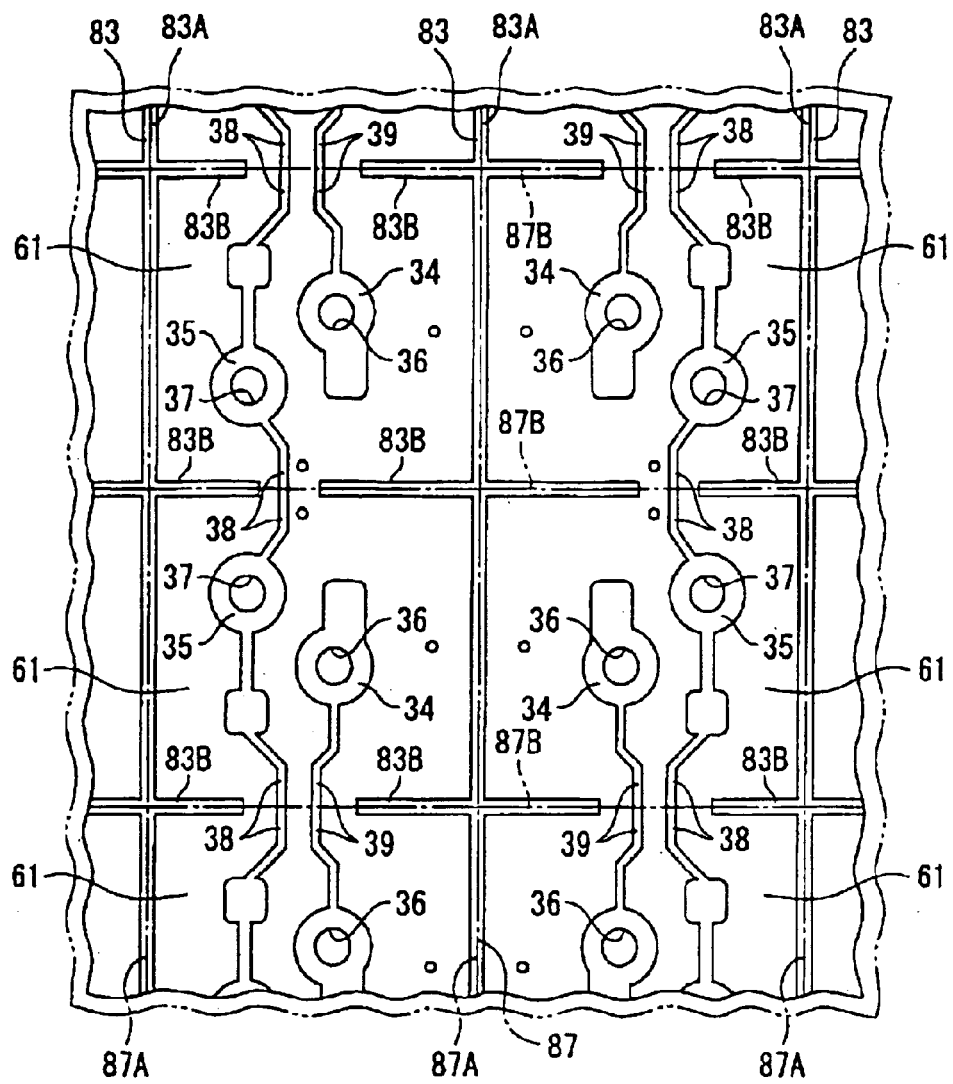
FIG. 4A and FIG. 4B are flat and cross-sectional views showing the first and second substrates according to the embodiment before the anodic bonding respectively.
Figure 4B:
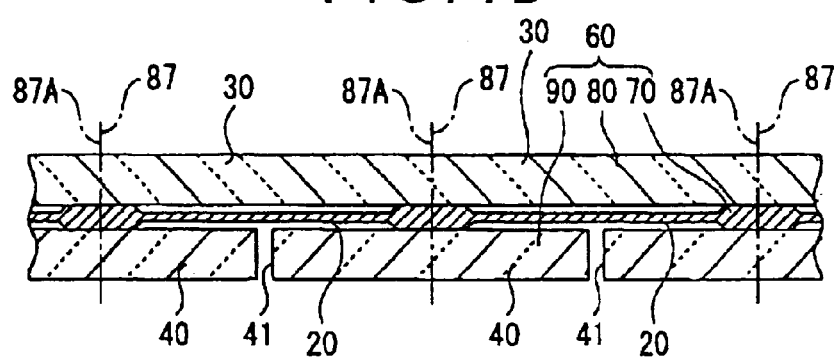

FIG. 4A and FIG. 4B are a flat view and a cross-sectional view each showing a wafer before anodic bonding between the upper substrate 30, the lower substrate 40 and the diaphragm 20.

The pressure sensor 10 is manufactured as a plurality of sensor chips 61 by establishing anodic bonding between the silicon wafer 70 and the upper and lower substrate wafers 80, 90 to form a laminated wafer 60, and then cutting the laminated wafer 60 along a lattice-like cutting line 87 (87A, 87B) as indicated by the chain and dash like in FIG. 4.

The silicon wafer 70 is manufactured as described below. At first, single-crystal silicon is generated by mixing dopant capable of reducing the specific resistance, and a silicon single-crystal wafer with the specific resistance of 1.0 Ω·cm or below and having the p-conduction type is produced. Then photolithography is applied to this silicon single-crystal wafer, and then the single-crystal wafer is dry-etched so that a plurality of diaphragms 20 are monolithically formed with a specified space thereon.

The upper substrate 80 has the central electrode 32, peripheral electrode 33 through-holes 36, 37, second signal fetching sections 34, 35, and an electrode 83 for anodic bonding formed by such a technique as, for instance, photolithography, and a plurality of upper substrate 30 are formed in the monolithic state.

Of these, each of the extended sections 38 in the second signal fetching sections 35 are formed in the continuous state in one direction on the upper substrate 80.

The electrode 83 for anodic bonding is formed in the lattice form so that it does not cross the extended section 38. The electrode 83 for anodic bonding comprises a stem line electrode section 83A extending along the extended section 38, and a branch line electrode section 83B extending in a direction crossing the stem line electrode section 83A at right angles.

The cutting line 87 comprises a cutting line 87A passing on the stem line electrode section 83A, and a cutting line 87B crossing the cutting line 87A at right angles and passing on the branch line electrode section 83B.

The lower substrate 90 has a plurality of pressure introducing holes 41 with a plurality of lower substrates 40 monolithically formed therewith.

The diaphragms 20 in these silicon wafers 70, the upper substrates 30 in the upper substrate wafer 80, and the lower substrates 40 in the lower substrate wafer 90 are provides at positions so that the components form the sensor chip 61 of the pressure sensor 10 when the wafers 70, 80, and 90 are laminated.

Figure 5:
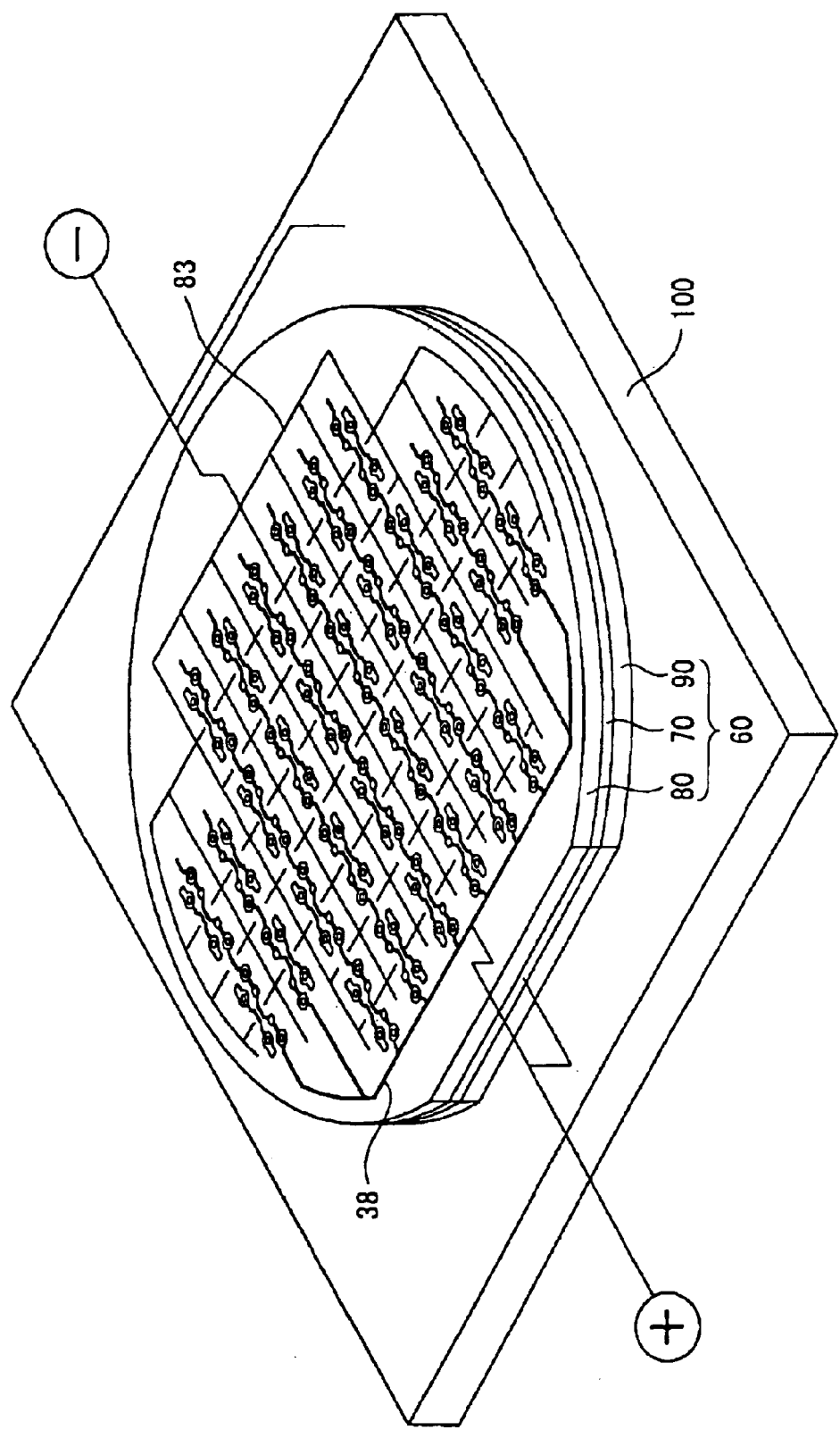
FIG. 5 is a view illustrating a procedure for anodic bonding between the first and second substrates and the movable electrode each according to the embodiment.

FIG. 5 is a view showing a procedure for anodic bonding between the upper and lower substrates 30, 40 and the diaphragm 20.

The lower substrate wafer 90, silicon wafer 70, and upper substrate wafer 80 are laminated in this order on an electrically conductible mounting base 100 for anodic bonding. Then a high voltage is loaded at a high temperature so that the silicon wafer 70 and the extended section 38 are charged positive and the electrode 83 for anodic bonding and the mounting base 100 are charged negative to establish anodic bonding between the wafers 70, 80, 90. The laminated wafer 60 is manufactured in this state.

Figure 6:
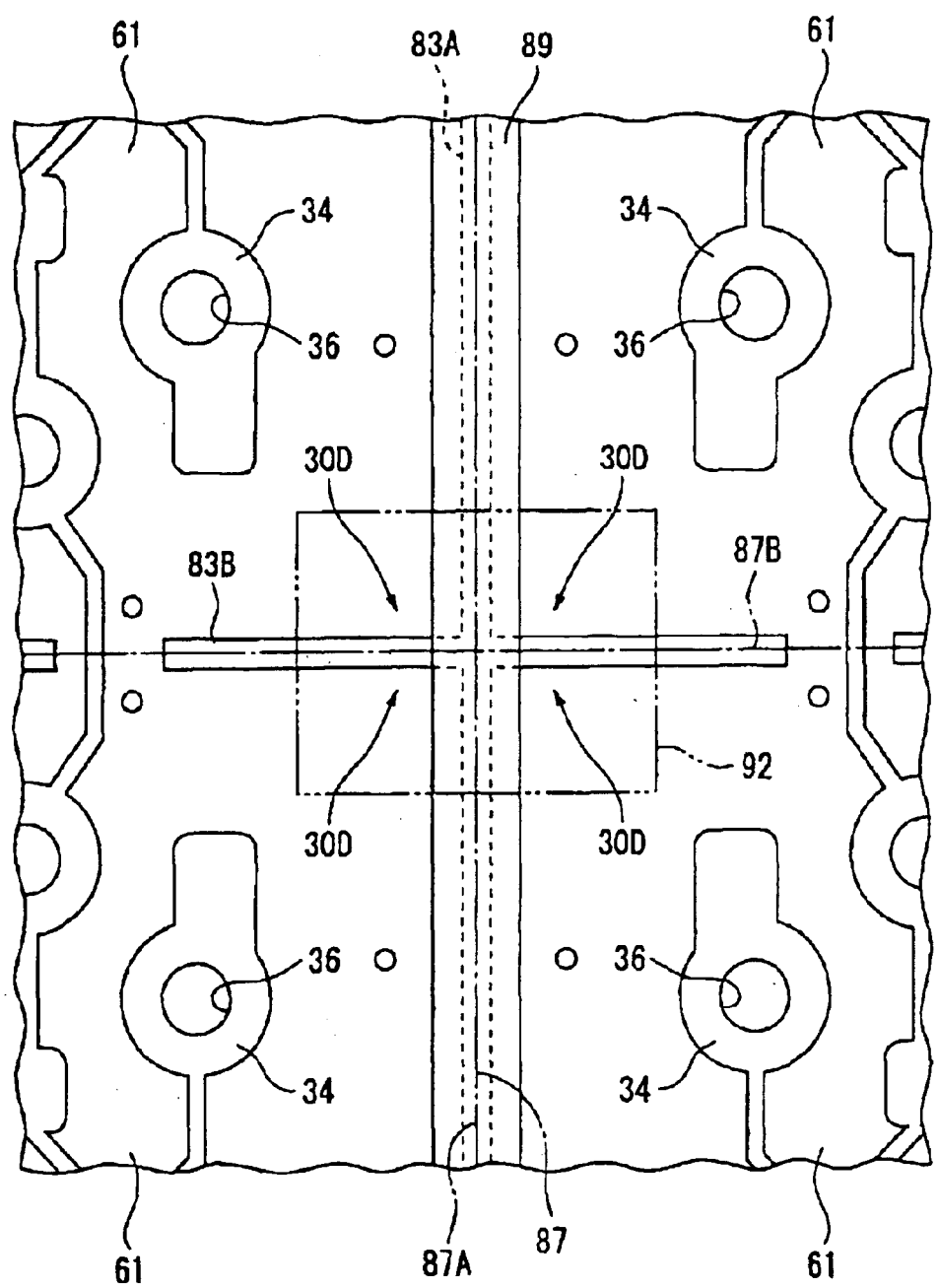
FIG. 6 is a flat view illustrating a procedure for forming a first signal fetching section and a wire bonding pad according to the embodiment.
Figure 7:
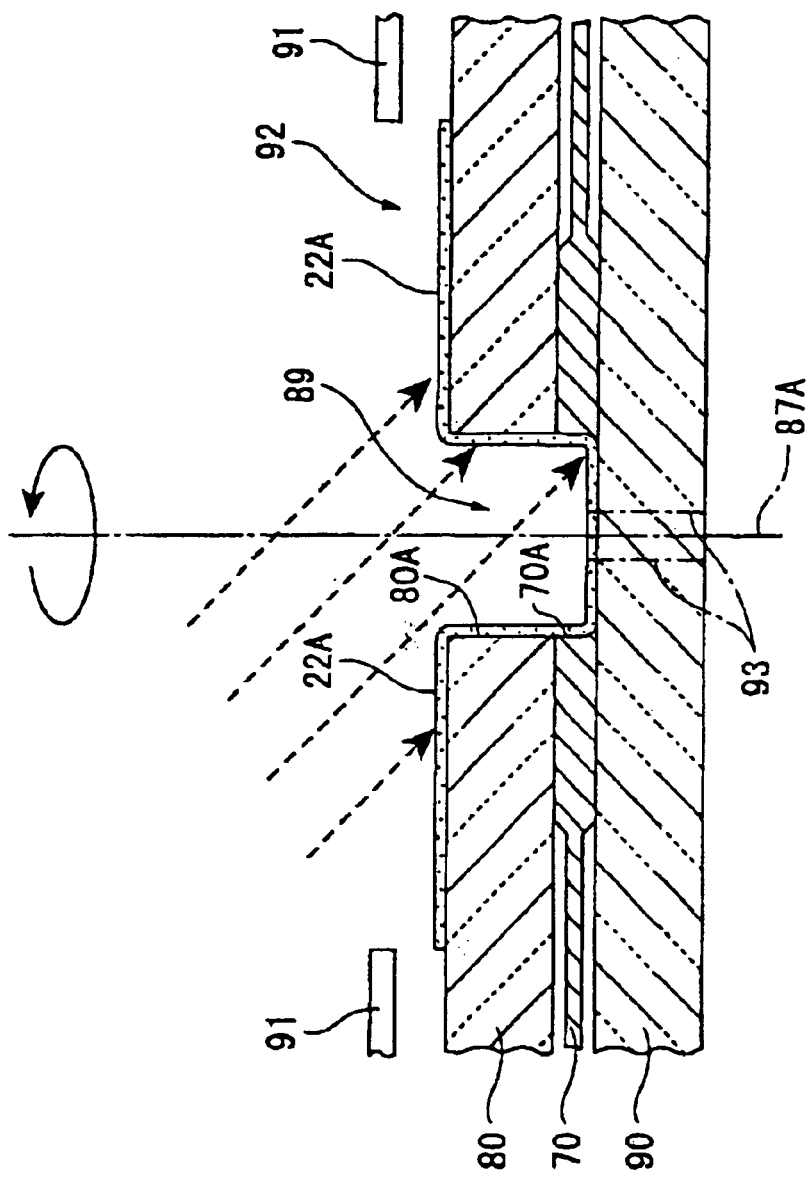
FIG. 7 is a cross-sectional view illustrating the procedure for forming the first signal fetching section and the wire bonding pad according to the embodiment.

FIG. 6 and FIG. 7 are a flat view and a cross-sectional view each illustrating a procedure for forming the first signal fetching section 22 and the wire bonding pads 51, 52, 53 respectively.

After the anodic bonding is completed, at first, the laminated wafer 60 is taken out from the mounting base 100, and a groove machining is carried out along a cutting line 87A between the second signal fetching sections 34 with a cutting blade or the like having a blade width sufficiently larger than that of the stem line electrode section 83A of the electrode 83 for anodic bonding to scrape off the stem line electrode section 83A indicated by the dashed line in FIG. 6 and also to form a groove 89.

The groove 89 is formed with the depth realized by scraping the lower substrate wafer 90 a little, and cut faces 70A and 80A of the silicon wafer 70 and the upper substrate 80 are exposed on the inner surface of the groove 89.

Then a metal mask 91 having a substantially rectangular mask opening 92 is placed so that the section where the cutting lines 87A and 87B on the upper substrate wafer 80 cross each other (as shown as the two-dot chain line in FIG. 6), namely the section corresponding to a corner section 30D of the sensor chip 61 is exposed. Then a material to be deposited such as titanium used in this embodiment is fed from above at the angle of 45 degrees in the diagonal direction against the mask opening (as indicated by the dashed line in FIG. 7) rotating either the laminated wafer 60 or the evaporation nozzle (not shown) around a vertical axis, or rotating both the laminated wafer 60 and the evaporation nozzle respectively in the counter directions. With this operation, a titanium evaporation film 22A is formed on the bottom surface of the groove 89 and on both side faces of the groove 89, namely on the cut faces 70A of the silicon wafer 70, cut faces 80A of upper substrate wafer 80 as well as on the portion where the cut lines 87A and 87B of the upper substrate wafers 80 cross each other.

Although not shown, a metal mask having mask openings corresponding to the positions of the wire bonding pads 51 to 53 is prepared, and with this metal mask, the gold evaporation film (corresponding to the upper layer section 51B of the wire bonding pads 51 to 53) is formed in succession according to the same procedure as that described above, after the titanium evaporation film (corresponding to the lower layer section 51A of the wire bonding pads 51 to 53) is formed, without releasing the vacuum state in the vacuum device, namely without a surface of the titanium evaporation film being oxidized.

Then, by using another cutting blade having a blade width smaller as compared to that of the cutting blade used for machining the groove 89 (for instance, a cutting blade with the blade width corresponding to a cutting space 93 indicated by the chain and dash line in FIG. 7), the evaporation film 22A is cut at a center in the lateral direction of the groove 89, namely along the cutting line 87A together with the lower substrate wafer 90 (regular cutting), and also the laminated wafer 60 is cut along all of other cutting lines 87A, 87B using the same cutting blade. With this operation, the evaporation film 22A is divided to four portions, and each of the quartered evaporation film 22A is provided as the first signal fetching section 22 electrically connected to the diaphragm 20. With this cutting operation, the pressure sensor 10 is taken out as a sensor chip 61 from the laminated wafer 60.

The blade width of the cutting blade used in this cutting work (regular cutting) is slightly larger than the width of the electrode 83 for anodic bonding, and by cutting along the cutting lines 87A, 87B, the branch line electrode 83B of the electrode 83 for anodic bonding is completely removed.

With the operations described above, the pressure sensor 10 is completed.

Figure 8:
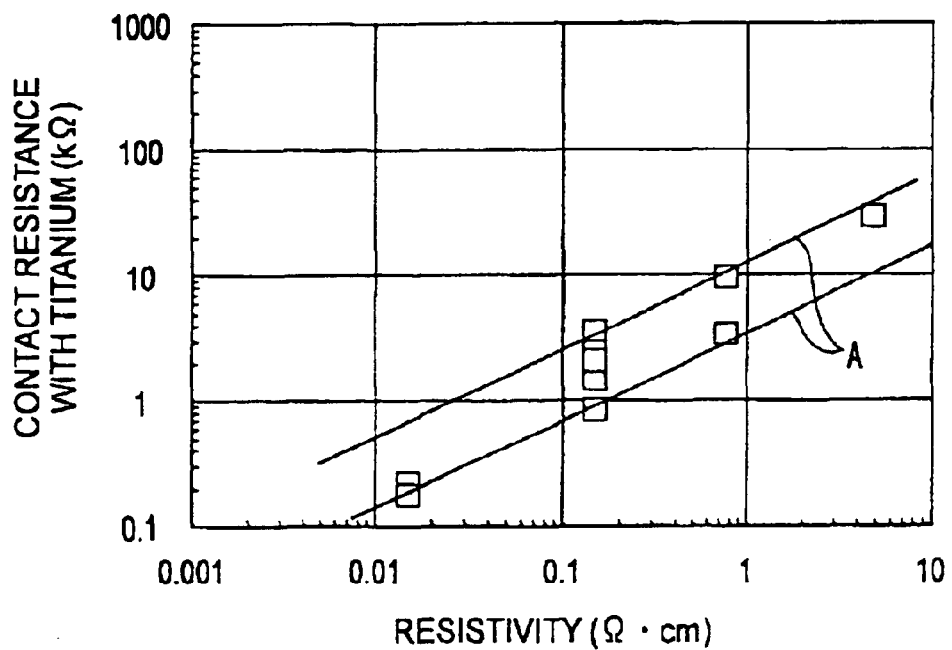
FIG. 8 is a view showing the relation between the specific resistance of silicon and the contact resistance between this silicon and titanium according to the present invention.
Figure 9:
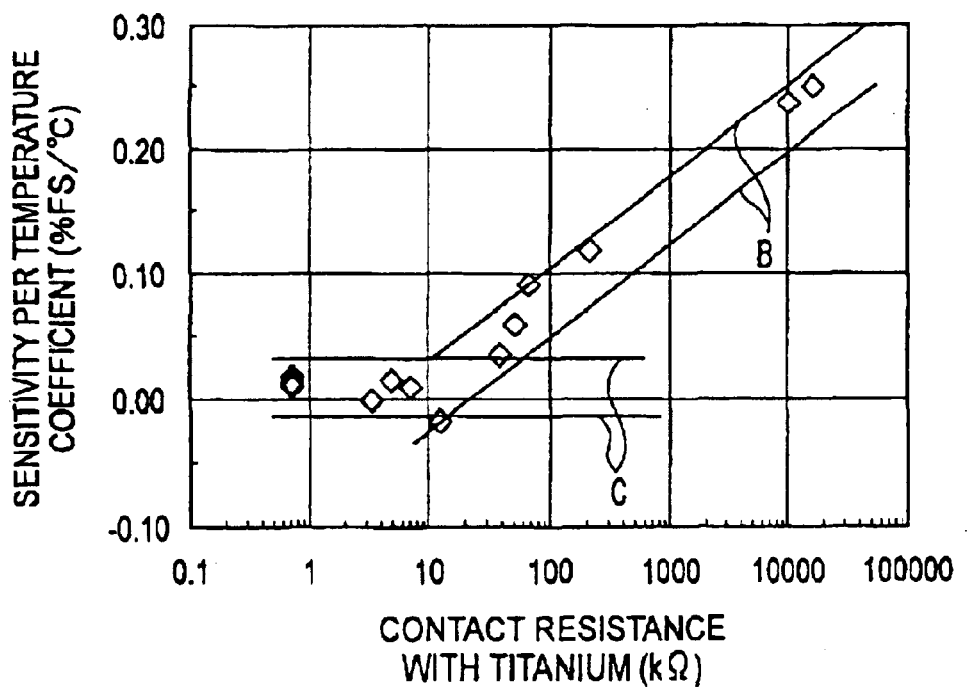
FIG. 9 is a view showing the relation between the contact resistance of silicon and titanium and the sensitivity temperature coefficient.
Figure 10:
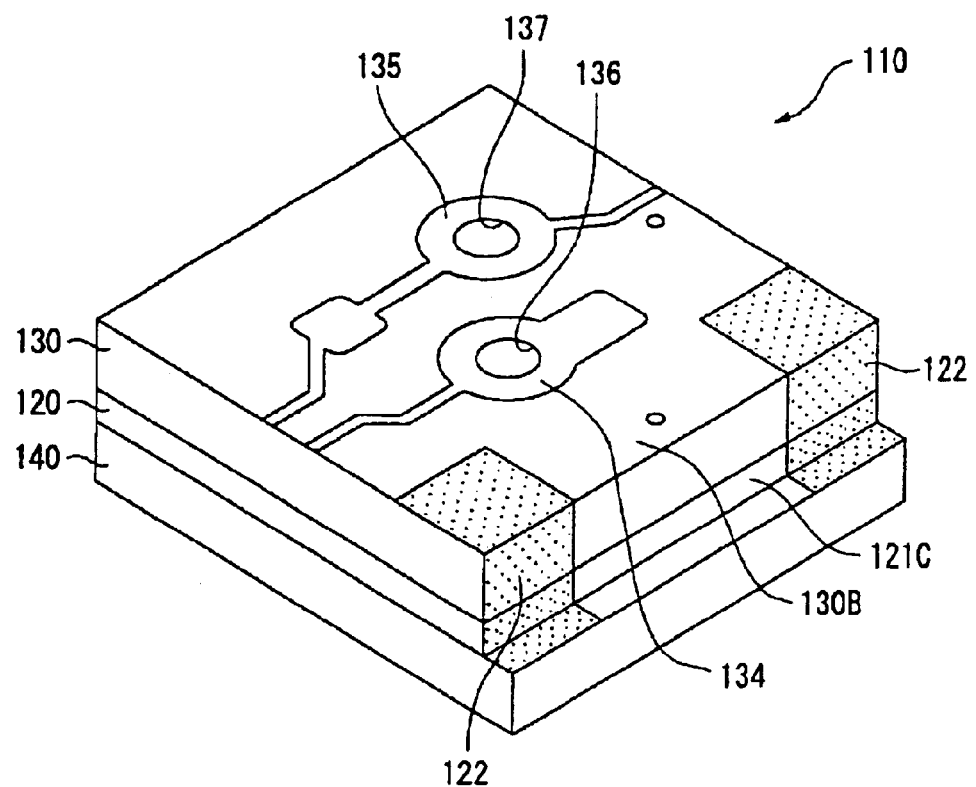
FIG. 10 is a general perspective view showing a converter based on the conventional technology.
Figure 11:
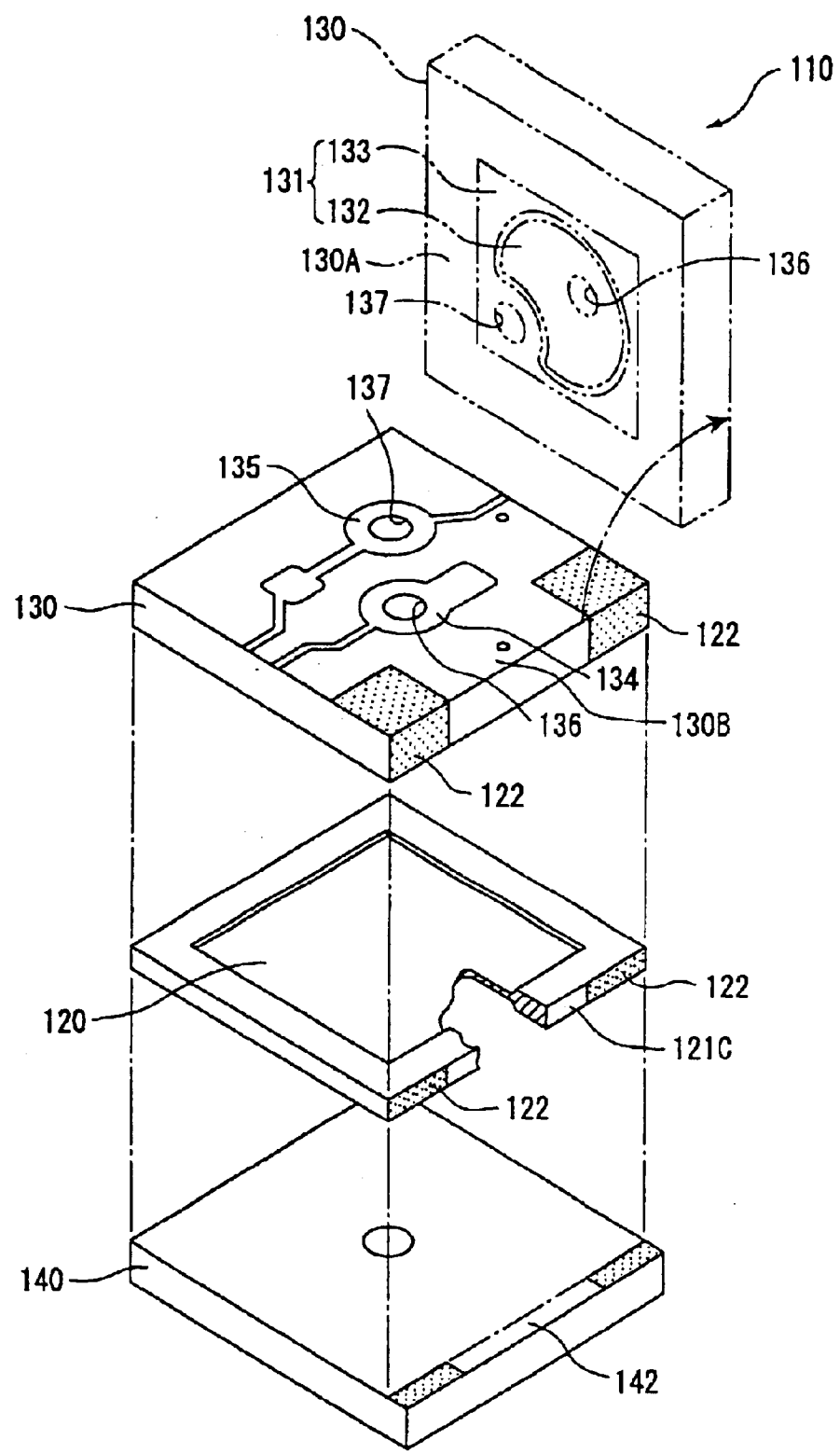
FIG. 11 is an exploded perspective view showing the converter based on the conventional technology.

FIG. 8 and FIG. 9 show a result of experiments in which the specific resistance of silicon is changed.

Namely, FIG. 8 shows the relation between the specific resistance of silicon and the contact resistance (ohmic resistance) of the silicon with titanium. Squares in FIG. 8 indicate experimental values, and the solid line A indicates the general gradient.

It is understood from this figure that, when the specific resistance of silicon is lowered by mixing dopant lowering the resistance value therein, also the contact resistance with titanium drops almost proportionately. FIG. 9 shows the relation between the contact resistance of silicon with titanium and the sensitivity temperature coefficient of a pressure sensor. The sensitivity temperature coefficient is the characteristics of the pressure sensor 10 against changes in temperature, and the lower this value is, the smaller the error in pressure detection due to changes in temperature is, and the more stably the pressure sensor can demonstrate its performance. Squares in FIG. 9 indicates experimental values, and the solid lines B and C indicates the general gradients. In a case where the contact resistance is 10 kΩ or over, when the contact resistance is lowered, the sensitivity temperature coefficient drops almost proportionately (solid line B). When the contact resistance is less than about 10 kΩ, even if the contact resistance is lowered, the sensitivity temperature coefficient does not drop proportionately, and the value is kept substantially constant (solid line C).

With the present invention, the following advantages are provided.

(1) As the first signal fetching section 22 is formed with metal having high corrosion resistance, different from the case where the first signal fetching section is formed with aluminum having low corrosion resistance like in the conventional technology, it can be used without degrading the performance as a converter even under the existence of corrosive gas.

(2) As the diaphragm 20 is formed with single-crystal silicon containing dopant lowering the resistance value, there occurs no problem concerning the energy barrier on a contact surface with the first signal fetching section 22, and excellent ohmic conjunction can be realized with the metal having high corrosion resistance which forms the first signal fetching section 22, so that a signal can accurately be fetched from the diaphragm 20 without fail.

(3) As the specific resistance of all of silicon forming the diaphragm 20 is held under 1.0 Ω·cm, dopant lowering the resistance value can be mixed in the entire wafer, and therefore, different from a case where impurities are locally mixed like in the conventional technology, a number of steps in the production process can be reduced, which makes it possible to reduce the production cost for the pressure sensor 10.

Further as the specific resistance of silicon is held under 1.0 Ω·cm, a pressure sensor having the excellent temperature characteristics can be manufactured by lowering the sensitivity temperature coefficient of the pressure sensor 10 as shown in FIG. 8 and FIG. 9.

(4) As the silicon having the p-conduction type is used for forming the diaphragm 20, the contact resistance can be held at a lower value as compared to that in a case where the silicon having the n-conduction type is used for forming the diaphragm 20, so that better ohmic conjunction can be obtained.

(5) As the first signal fetching section 22 is formed with titanium, the first signal fetching section 22 can be protected from corrosive gas with lower cost and without fail.

(6) The pressure sensor 10 is mounted on a circuit board with the lower substrate 40 facing downward, and then the first signal fetching section 122 and the second signal fetching sections 34, 35 and a signal processing circuit on the circuit board are connected by means of wire bonding or the like. In the pressure sensor 10, the extended section 42 is provided on the lower substrate 40, and the first signal fetching section 22 is provided spanning from a surface of the extended section 42 in the side to the upper substrate 30 up to a surface of the upper substrate 30, so that the first signal fetching section 22 does not reach an edge of the lower substrate 40. Therefore, even if the pressure sensor 10 is mounted on a circuit board or the like with the edge side of the lower substrate 40 facing downward, the circuit board and the first signal fetching section 22 do not contact each other, so that electric disturbances as picking up noises do not occur.

(7) Each of the wire bonding pads 51 to 53 comprises two layers; namely the lower layer section 51A formed with titanium well adapted to conjunction to an oxide film on a surface of titanium forming the first signal fetching section 22, and the upper layer section 51B formed with gold well adapted to conjunction with the lower layer section 51A and also having good bondability and high corrosion resistance, and therefore even if an oxide film 22C is generated on a surface of any of the first and second signal fetching sections 22, 34, and 35, the lower layer section 51A can be jointed thereto. Further as the upper layer section 51B well adapted to bonding can electrically be connected to necessary sections of the signal processing circuit or the like via a wire, signals from the first and second signal fetching sections 22, 34, 35 can accurately be delivered to the signal processing circuit through the wire bonding pads 51 to 53 without fail.

(8) After anodic bonding between the upper substrate 30, lower substrate 40 and the diaphragm 20 is established, the first signal fetching section 22 is formed by means of mask evaporation, and therefore the first signal fetching section 22 can be formed without employing a complicated process such as photolithography, so that the pressure sensor 10 can easily be manufactured.

(9) When the wire bonding pads 51 to 53 are formed, at first the lower layer section 51A is formed by means of mask evaporation, and then the upper layer section 51B is formed in succession by means of mask evaporation without a surface of the lower layer section 51A being oxidized, namely without allowing generation of an oxide film on a surface of the lower layer section 51A, so that the lower layer section 51A and the upper layer section 51B can be adhered to each other closely without fail in each of the wire bonding pads 51 to 53. Therefore, the wire bonding pads 51 to 53 can be formed without employing a complicated process such as photolithography, so that the pressure sensor 10 can easily be manufactured.

The present invention is not limited to the embodiment described above, and variations and modifications in a range where the objects of the present invention can be achieved are included within the scope of the present invention.

For instance, although the silicon wafer 70 is manufactured by dry-etching a silicon single-crystal wafer by means of photolithography in the embodiment described above, the present invention is not limited to this technique, and wet-etching may be employed for manufacturing the silicon wafer 70. In this case, however, it is required that the specific resistance of the silicon single-crystal wafer is 0.005 Ω·cm or more.

Even in the modifications as described above, the same advantages as those described in (1) to (9) above can be obtained.

What is claimed is:

1. A converter comprising a first substrate having a detection face; a movable electrode provided with a space from the detection face of said first substrate and capable of being displaced to and from said first substrate; a fixed electrode provided on the detection face of said first substrate; and a first signal fetching section electrically connected to said movable electrode, wherein said first signal fetching section is formed with metal having high corrosion resistance, and said movable electrode is formed by dry-etching single-crystal silicon with the specific resistance held at 1.0 Ω·cm or below by mixing therein dopant lowering the resistance value.

2. A converter comprising a first substrate having a detection face; a movable electrode provided with a space from the detection face of said first substrate and capable of being displaced to and from said first substrate; a fixed electrode provided on the detection face of said first substrate; and a first signal fetching section electrically connected to said movable electrode, wherein said first signal fetching section is formed with metal having high corrosion resistance, and said movable electrode is formed by wet-etching single-crystal silicon with the specific resistance held in a range from 0.005 to 1.0 Ω·cm or below by mixing therein dopant lowering the resistance value.

3. The converter according to claim 1, wherein the silicon forming said movable electrode has the p-conduction type.

4. The converter according to claim 2, wherein the silicon forming said movable electrode has the p-conduction type.

5. The converter according to claim 1, wherein the metal forming said first signal fetching section is titanium.

6. The converter according to claim 2, wherein the metal forming said first signal fetching section is titanium.

7. The converter according to claim 3, wherein the metal forming said first signal fetching section is titanium.

8. The converter according to claim 4, wherein the metal forming said first signal fetching section is titanium.

9. The converter according to claim 1 further comprising:

a second substrate provided with a space to a surface of said movable electrode in the contrary side from the surface opposing to the detection face of said first substrate, wherein an extended section extending outward more as compared to a side face of said first substrate is provided on said second substrate, and said first signal fetching section is provided spanning from a surface of said extended section in the side closer to said first substrate up to a surface in the contrary side from the detection face of said first substrate.

10. The converter according to claim 2 further comprising a second substrate provided with a space from a surface of said movable electrode in the contrary side from the surface opposing to the detection face of said first substrate, wherein an extended section extending outward more as compared to a side face of said first substrate is provided on said second substrate, and said first signal fetching section is provided spanning from a surface of said extended section in the side closer to said first substrate up to a surface in the contrary side from the detection face of said first substrate.

11. The converter according to claim 9, wherein a wire bonding pad is provided in said first signal fetching section; said wire bonding pad has at least two layers; the lower layer section is formed with metal well adapted to conjunction with an oxide film on a surface of metal forming said first signal fetching section; and the upper layer section is formed with metal well adapted to conjunction with said lower layer section and having good bondability and high corrosion resistance.

12. The converter according to claim 10, wherein a wire bonding pad is provided in said first signal fetching section; said wire bonding pad has at least two layers; the lower layer section is formed with metal well adapted to conjunction with an oxide film on a surface of metal forming said first signal fetching section; and the upper layer section is formed with metal well adapted to conjunction with said lower layer section and having good bondability and high corrosion resistance.

13. The converter according to claim 1, wherein the converter is an electrostatic capacitance type of pressure sensor chip in which a pressure to be measured is introduced to a first face of said movable electrode opposite to a second face facing the detection face of the first substrate.

14. The converter according to claim 2, wherein the converter is an electrostatic capacitance type of pressure sensor chip in which a pressure to be measured is introduced to a first face of said movable electrode opposite to a second face facing the detection face of the first substrate.

15. A method of manufacturing the converter according to claim 9 comprising the steps of:

establishing anodic bonding between said first and second substrates and the movable electrode; and forming said first signal fetching section by means of mask evaporation.

16. A method of manufacturing the converter according to claim 10 comprising the steps of:

establishing anodic bonding between said first and second substrates and the movable electrode; and forming said first signal fetching section by means of mask evaporation.

17. A method of manufacturing the converter according to claim 11 comprising the steps of:

establishing anodic bonding between said first and second substrates and the movable electrode; and forming said first signal fetching section by means of mask evaporation.

18. A method of manufacturing the converter according to claim 12 comprising the steps of:

establishing anodic bonding between said first and second substrates and the movable electrode; and forming said first signal fetching section by means of mask evaporation.

19. A method of manufacturing the converter according to claim 11 comprising the steps of:

establishing anodic bonding between said first and second substrates and the movable electrode;

forming a lower layer section of said wire bonding pad by means of mask evaporation; and forming an upper layer section of said wire bonding pad in succession without a surface of the lower layer section of the wire bonding pad being oxidized.

20. A method of manufacturing the converter according to claim 12 comprising the steps of:

establishing anodic bonding between said first and second substrates and the movable electrode;

forming a lower layer section of said wire bonding pad by means of mask evaporation; and forming an upper layer section of said wire bonding pad in succession without a surface of the lower layer section of the wire bonding pad being oxidized.

* * * * *